United States Patent Office.

HUGH M. SANDERSON, OF NOBLE, ILLINOIS.

Letters Patent No. 74,151, dated February 4, 1868.

---

IMPROVED EYE-MEDICINE.

---

*The Schedule referred to in these Letters Patent and making part of the same.*

---

TO ALL WHOM IT MAY CONCERN:

Be it known that I, HUGH M. SANDERSON, of Noble, in the county of Richland, and State of Illinois, have invented a new and improved Eye-Medicine; and I do hereby declare that the following is a full, clear, and exact description thereof, which will enable those skilled in the art to make and use the same.

This invention consists in certain medicines or compositions which are to be applied externally and taken internally, as the disease of the eye may develope, the different preparations, when properly administered, being designed to cure all ordinary diseases of the eye.

In carrying out my invention, I employ four different medicines or compositions formed of different ingredients, although intended to produce the same result, being used in quick succession, so as to act directly on the diseased parts and the sources of the disease.

These several compositions are numbered 1, 2, 3, and 4.

No. 1 is a tonic, composed of, mandrake-root, one pound; black-root, one-fourth of a pound; leaves of plantain or crow-foot, one-fourth of a pound. Boil together with water (to cover) two hours, then steep till one-half the bulk is evaporated, then add three-fourths of a pound of white sugar, when it is ready for use.

No. 2 is an eye-wash, composed of twelve grains of pure lunar caustic in four ounces of rain-water.

No. 3 is a forehead-salve, composed of equal parts of solid extract of belladonna, mercurial ointment, and fluid extract of hyoscyamus.

No. 4 is an eyelid-salve, composed of equal parts of the bark of bitter-sweet-root, stramonium-leaves, cicuta-leaves, and the root of the deadly nightshade. Steep in spirits and add two parts of lard, and steep it down or evaporate to an ointment. To one ounce of this ointment add, solid extract of hyoscyamus, one and one-half ounce; fluid extract of taraxacum, one-half ounce; gum of opium, one and one-half ounce.

The above-prepared medicines are to be taken and applied in quick succession, one after the other, in their order, as mentioned, so that each may have its appropriate and desired effect, and in combination tend to produce the desired result.

Having thus described my invention, I claim as new, and desire to secure by Letters Patent—

The medicines or compositions numbered 1, 2, 3, and 4, composed of the ingredients and in the proportions substantially as herein described and specified.

HUGH M. SANDERSON.

Witnesses:
　JOSEPH T. HANNA,
　GEO. T. FINNELL.